United States Patent
Wang et al.

(10) Patent No.: US 7,522,232 B2
(45) Date of Patent: Apr. 21, 2009

(54) LIQUID CRYSTAL DISPLAY MODULE PACKAGE

(75) Inventors: Chih-Yuan Wang, Shengang Township (TW); Hsien-Hsing Wu, Taichung (TW)

(73) Assignee: Wintek Corporation, Tanzih Township (TW)

( * ) Notice: Subject to any disclaimer, the term of this patent is extended or adjusted under 35 U.S.C. 154(b) by 178 days.

(21) Appl. No.: 11/750,595

(22) Filed: May 18, 2007

(65) Prior Publication Data

US 2008/0284956 A1     Nov. 20, 2008

(51) Int. Cl.
*G02F 1/1335* (2006.01)
(52) U.S. Cl. .......................... 349/62; 349/58
(58) Field of Classification Search ............... 349/58, 349/62
See application file for complete search history.

(56) References Cited

U.S. PATENT DOCUMENTS 5,886,759 A * 3/1999 Mashino et al. ............... 349/65
2004/0076768 A1 4/2004 Kamiya et al.

* cited by examiner

*Primary Examiner*—David Nelms
*Assistant Examiner*—Phu Vu
(74) *Attorney, Agent, or Firm*—Workman Nydegger

(57) ABSTRACT

A liquid crystal display module (LCM) package applies the light absorber with thermal conductivity and the light reflector with thermal conductivity to bind the liquid crystal panel and the backlight module respectively to dissipate the internal heat effectively. Besides, the light reflector with thermal conductivity can be used for improving the light efficiency of the backlight module and the light absorber with thermal conductivity can be used to avoid the ambient light from causing the reflection interference.

19 Claims, 4 Drawing Sheets though specific embodiments with reference to the figures. The reference numerals mentioned in the specification correspond to equivalent reference numerals in the figures.

LIQUID CRYSTAL DISPLAY MODULE PACKAGE

BACKGROUND OF THE INVENTION

1. Field of Invention

The invention relates to a liquid crystal display module package, and more particularly to a liquid crystal display module package which has a light reflector with thermal conductivity and a light absorber with thermal conductivity.

2. Related Art

Generally, in a liquid crystal display module (LCM), a light emitting diode (LED) is used as a light source to provide light which is guided by a backlight module to a liquid crystal panel. In order to have a better outcome for a LCM, a LED needs more power, which is generally accompanied by creating more heat. As a result, the display quality of the LCM decreases and some unwanted effects, such as low contrast ratio and the material deteriorating, also occur.

A conventional LCM usually generates a lot of heat due to the requirement of high brightness of backlight module. While the heat is unable to be efficiently removed, the LCM often overheats. For example, in U.S. published application Ser. No. 2004/0076768, an LCM is disclosed in which a double coated tape (DCT) is utilized to bind the liquid crystal panel with the backlight module. In addition, one side of the DCT is low reflective and the other side of the DCT is high reflective. The high reflective side is consisted of a white polyethylene terephthalate (PET) to bind the backlight module, and the low reflective side is consisted of a black material formed on the white PET to bind the liquid crystal panel. The black low reflective side can absorb light, so as to avoid the interference due to the reflective ambient light reflected by the tape. Moreover, since the high reflective side of the tape is composed of a white PET material and faces toward the backlight module, the light emitted from the backlight module could be effectively reflected by the tape. Therefore, the light efficiency could be improved. However, the PET material has no thermal conductivity to dissipate the heat. Besides, a conventional thermal conductive DCT is made by distributing the thermal conductive ceramic particles in acrylic foam, which can not provide a light reflective side and a light absorption side to meet the need when the liquid crystal panel and the backlight module are bound.

According to the description above, in an LCM, the element for sticking the liquid crystal panel and the backlight module together requires both of the light reflective and the light absorption properties, and it also requires to effectively dissipate the heat generated by the backlight module. Therefore, how to provide a package structure which improves the thermal conductivity of the LCM and the light efficiency of the backlight module is an important issue.

SUMMARY OF THE INVENTION

According to the foregoing problems, the invention provides a liquid crystal display module (LCM) package, which uses a light absorber with thermal conductivity (hereafter called a light absorber for short) and a light reflector with thermal conductivity (hereafter called a light reflector for short) to bind a liquid crystal panel and a backlight module in order to dissipate the internal heat of the LCM, wherein at least one of the light absorber and the light reflector has the characteristic of thermal conductivity. Hence, the light absorber or the light reflector can dissipate the heat of backlight module. Preferably, both of the light absorber and the light reflector have the characteristic of thermal conductivity.

In this case, the heat from backlight module can travels through the light reflector to the light absorber. The light reflector attached to the backlight module can improve the light efficiency of the backlight module and the light absorber attached to the liquid crystal panel can avoid the reflection interference from the ambient light.

Hereinafter, several illustrative embodiments of the invention are presented, each of which includes a liquid crystal panel, a light absorber, a light reflector and a backlight module. In one embodiment, one side of the light absorber binds with one side of the liquid crystal panel, one side of the light reflector binds with the other side of the light absorber, and one side of the backlight module binds with the other side of the light reflector, so as to conduct the heat from the backlight module to the light reflector and the light absorber.

Further, the light absorber includes a first resin layer, a plurality of first thermal conductive particles, a plurality of light absorption particles and a first adhesive. The first thermal conductive particles and the light absorption particles distribute in the first resin layer, and the first adhesive is coated on the first resin layer. In addition, the light reflector includes a second resin layer, a plurality of second thermal conductive particles, a plurality of light reflective particles and a second adhesive. The second thermal conductive particles and the light reflective particles distribute in the second resin layer, and the second adhesive is coated on the second resin layer. Moreover, the light reflector may be composed of other materials, which include a metal layer and an adhesive layer disposed on the metal layer.

In another embodiment, the LCM package of the invention can further include a thermal conductive layer located between the light absorber and the light reflector. The thermal conductive layer includes a third resin layer and a plurality of thermal conductive particles. The third thermal conductive particles distribute in the third resin layer. In addition, the thermal material can be a metal.

The features and practice of the preferred embodiments of the invention will be illustrated below in detail with reference to the drawings.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given below, which is for illustration only and thus is not limitative of the invention, wherein.

DETAILED DESCRIPTION

Figure 1:
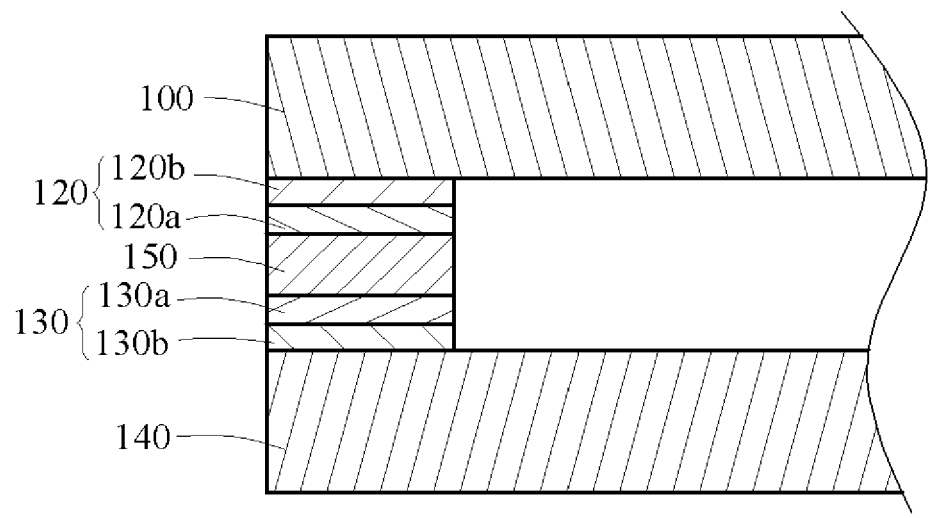
FIG. 1 is a first embodiment of the invention.

The contents of the invention are described in details through specific embodiments with reference to the figures. The reference numerals mentioned in the specification correspond to equivalent reference numerals in the figures.

As shown in FIG. 1, it is a first embodiment of the invention. The liquid crystal display module (LCM) package may include a liquid crystal panel 100, a light absorber 120, a thermal conductive layer 150, a light reflector 130, and a backlight module 140. The light absorber or the light reflector has the characteristic of thermal conductivity; even both of the light absorber and the light reflector have the characteristic of thermal conductivity. Hereinafter, we use the examples that both of the light absorber and the light reflector have the characteristic of thermal conductivity for illustrating the invention. One side of the light absorber 120 binds with one side of the liquid crystal panel 100, one side of the light reflector 130 binds with the other side of the light absorber 120, and one side of the backlight module 140 binds with the other side of the light reflector 130, so as to conduct the heat generated from the backlight module 140 to the light reflector 130 and the light absorber 120. The backlight module includes a light guide plate, a diffuser, a reflect sheet, and a light emitting diode (LED).

The light absorber 120 includes a first resin layer 120a and a first adhesive 120b. The first resin layer 120a is made by mixing the resin, thermal conductive particle, and light absorption particle. The thermal conductive particles are metal particles, graphite particles or ceramic particles. The metal particles can be made of copper, silver, nickel, iron, aluminum, tin, cobalt, chromium, manganese or alloys thereof. The light absorption particles can be black color particles. In addition, the first resin layer is used as a medium to distribute the thermal conductive particles and the light absorption particles therein, so that the first resin layer 120a can have a thermal conductive property to absorb the ambient light. Therefore, the reflection interference caused by the ambient light can be avoided. Coating an adhesive on the surface of the first resin layer 120a forms the first adhesive 120b. The first adhesive 120b can make the light absorber 120 be capable of adhering to the liquid crystal panel 100.

The thermal conductive layer 150 may include polyethylene terephthalate (PET), polytetrafluoroethylene (PTFE) or other resins such as polyolefin resins, mixed with the thermal conductive particles to form a thicker layer for supporting the light absorber 120 and the light reflector 130. Besides, the thermal conductive layer 150 can be a metal layer. The material of the metal layer can be copper, silver, nickel, iron, aluminum, tin, cobalt, chromium, manganese or alloys thereof. A preferred thickness of the thermal conductive layer 150 ranges from 500 Å to 1000 μm.

The light reflector 130 may include a second resin layer 130a and a second adhesive 130b. The second resin layer 130a is made by mixing the resin, thermal conductive particle, and light reflective particle. The light reflective particles may be white color particles. In addition, the second resin layer is used as a medium to distribute the thermal conductive particles and the light reflective particles therein, so that the second resin layer 130a can have a thermal conductive property and be capable of being a reflective surface of the backlight module 140 for improving the light efficiency. Coating an adhesive on the surface of the second resin layer 130a can form the second adhesive 130b. The second adhesive 130b can make the light reflector 130 be capable of adhering to the backlight module 140. Besides, the second resin layer 130a can be a metal layer and the second adhesive 130b can be an adhesive layer coated on the metal layer. The metal material can include copper, silver, nickel, iron, aluminum, tin, cobalt, chromium, manganese or alloys thereof. A preferred thickness of the metal layer ranges from 10 Å to 100 μm.

In the first embodiment, the heat generated from the backlight module 140 during the operation is conducted through the light reflector 130, the thermal conductive layer 150, and the light absorber 120 to the liquid crystal panel 100. Therefore, the heat can be dissipated effetely.

Figure 2:
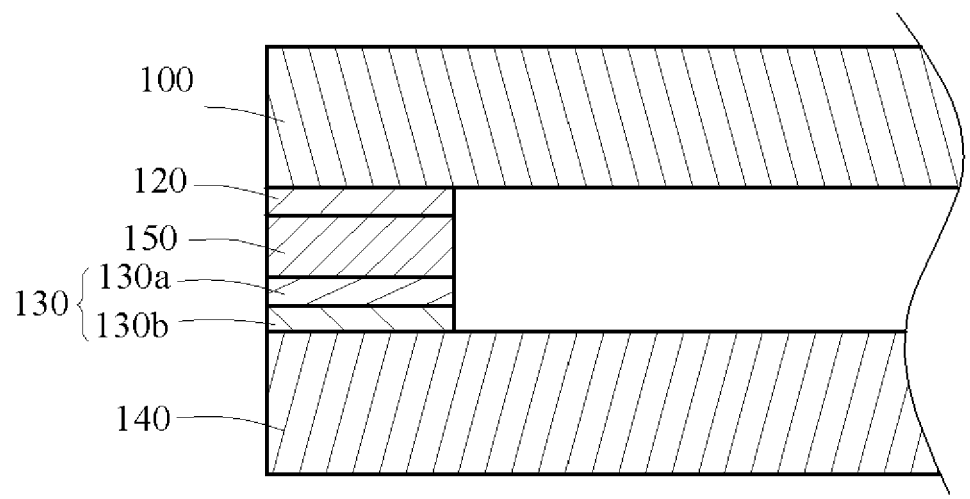
FIG. 2 is a second embodiment of the invention.

As shown in FIG. 2, it is the second embodiment of the invention. The light absorber 120 is made by mixing the resin, thermal conductive particle, light absorption particle, and adhesive, so that the light absorber 120 is thermal conductive, light absorptive, and sticky. When a third resin layer with thermal conductive particles is chosen as the thermal conductive layer 150, the light reflector 130 includes a second resin layer 130a with a second adhesive 130b disposed thereon. When a metal material is chosen for the thermal conductive layer 150, the light reflector 130 includes a second resin layer 130a that is made by mixing the resin, thermal conductive particle, and light reflective particle. The second adhesive 130b capable of adhering to the backlight module 140 is coated on the second resin layer 130a.

Figure 3:
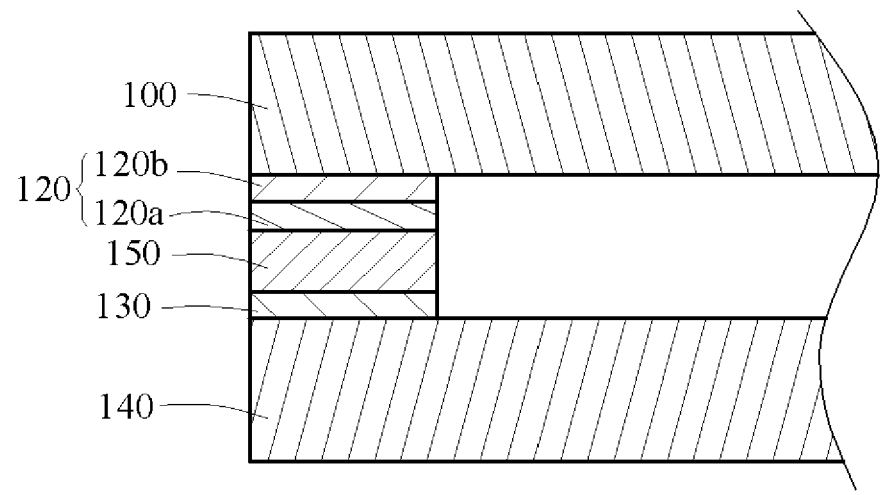
FIG. 3 is a third embodiment of the invention.

As shown in FIG. 3, it is the third embodiment of the invention. The light reflector 130 is made by mixing the resin, thermal conductive particle, light reflective particle, and adhesive, so that the light reflector 130 is thermal conductive, light reflective and sticky. The thermal conductive layer 150 is made by mixing a resin with thermal conductive particles or a metal material. The first resin layer 120a for the light absorber 120 is made by the resin, thermal conductive particle, and light absorption particle, so that the first resin layer 120a is thermal conductive and light absorbable. The first adhesive 120b capable of adhering to the liquid crystal panel 100 is coated on the first resin layer 120a.

Figure 4:
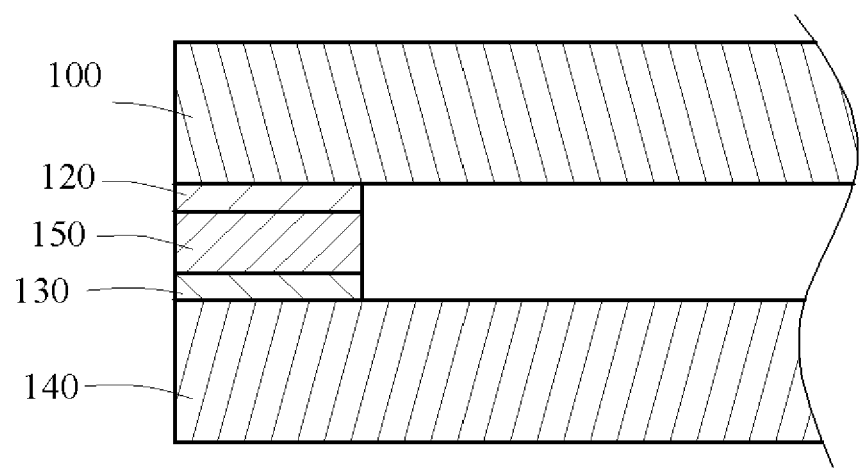
FIG. 4 is a fourth embodiment of the invention.

As shown in FIG. 4, it is the fourth embodiment of the invention. The light absorber 120 is made by mixing the resin, thermal conductive particle, light absorption particle, and adhesive, so that the light absorber 120 is thermal conductive, light absorptive, and sticky. The thermal conductive layer 150 is made by mixing a resin with thermal conductive particles or a metal material. The light reflector 130 is made by mixing the resin, thermal conductive particle, light reflective particle, and adhesive, so that the light reflector 130 is thermal conductive, light reflective, and sticky.

In the first, second, third, and fourth embodiments, since the thermal conductive layer 150 provides support to the light absorber 120 and the light reflector 130; therefore, less material is needed in the light absorber 120 and the light reflector 130, so costs can be reduced.

Figure 5:
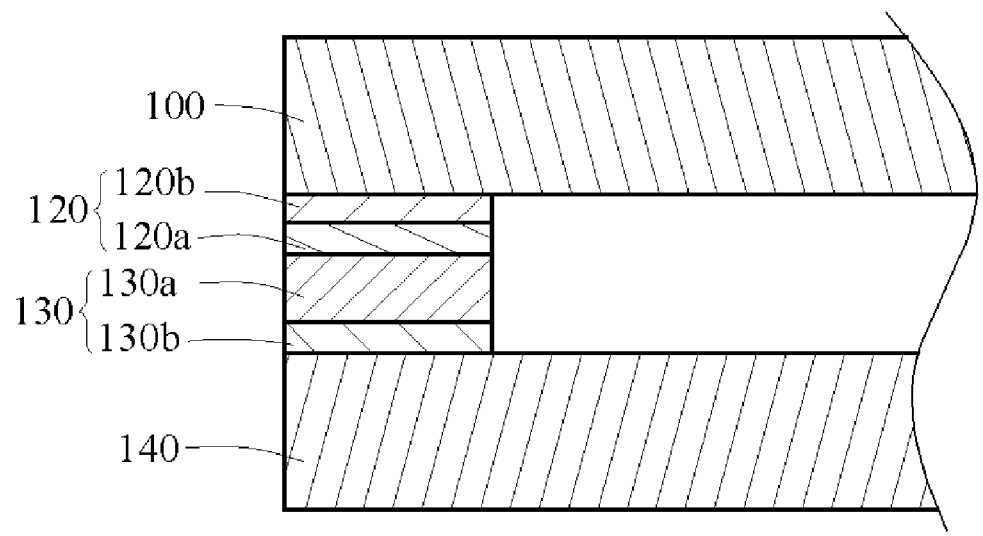
FIG. 5 is a fifth embodiment of the invention.

As shown in FIG. 5, it is the fifth embodiment of the invention. The liquid crystal display module (LCM) package may include a liquid crystal panel 100, a light absorber 120, a light reflector 130 and a backlight module 140. The light absorber 120 may include a first resin layer 120a and a first adhesive 120b. The first resin layer 120a is made by mixing the resin, thermal conductive particle and light absorption particle. Coating an adhesive on the surface of the first resin layer 120a can form the first adhesive 120b. The first adhesive 120b may make the light absorber 120 be capable of adhering to the liquid crystal panel 100.

The light reflector 130 may include a second resin layer 130a and a second adhesive 130b. The second resin layer 130a is made by mixing the resin, thermal conductive particle, and light reflective particle. The resin is not only used as a medium to distribute the thermal conductive particles and the light absorption particles therein but also supports the light absorber 120 by large amount of resin. Coating an adhesive on the surface of the second resin layer 130a can form the second adhesive 130b. The second adhesive 130b can make the light reflector 130 be capable of adhering to the backlight module 140. In addition, the second resin layer 130a can be a thicker metal layer to support the light absorber 120. Also, the second adhesive 130b can be coated on the metal layer.

Moreover, a certain amount of resin can also be added to the first resin layer 120a for supporting the light reflector 130. Therefore the resin for supporting may not be necessary included in the second resin layer 130a, which can thinner the thickness of the second resin layer 130a.

In the fifth embodiment, the heat generated from the backlight module 140 during the operation may be conducted through the light reflector 130 and the light absorber 120 to the liquid crystal panel 100. Therefore, the heat dissipation effect can be improved.

Figure 6:
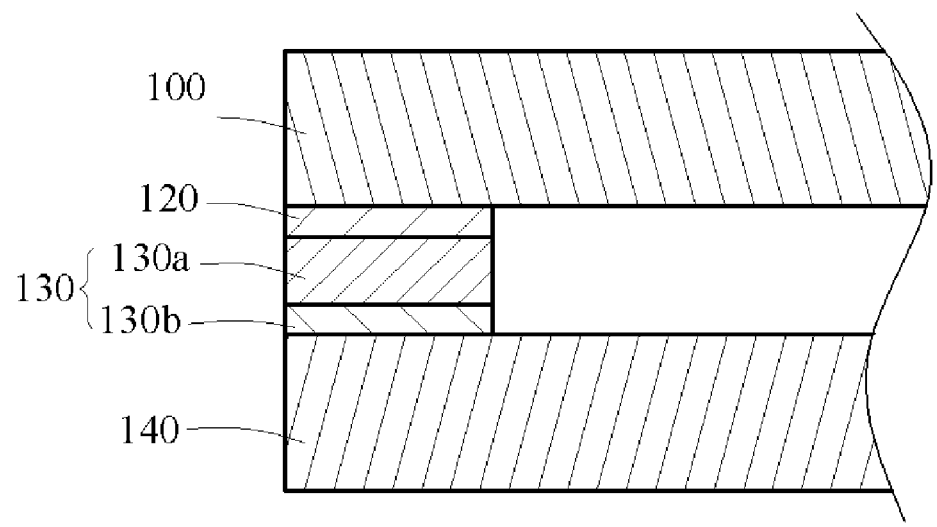
FIG. 6 is a sixth embodiment of the invention.

As shown in FIG. 6, it is the sixth embodiment of the invention. The light absorber 120 is made by mixing the resin, thermal conductive particle, light absorption particle, and adhesive, so that the light absorber 120 is thermal conductive, light absorptive, and sticky. The light reflector 130 may include a second resin layer 130a and a second adhesive 130b. The second resin layer 130a is made by mixing the resin, thermal conductive particle, and light reflective particle, and the amount of the resin is plenty enough for supporting the light absorber 120. Coating an adhesive on the second resin layer 130a can form the second adhesive 130b. In addition, the second resin layer 130a can be a thicker metal layer to support the light absorber 120, and the second adhesive 130b can be coated on the metal layer.

Moreover, a certain amount of resin can also be added to the light absorber 120 for supporting the light reflector 130. Therefore the resin for supporting may not be necessary included in the second resin layer 130a, which can thinner the thickness of the second resin layer 130a.

Figure 7:
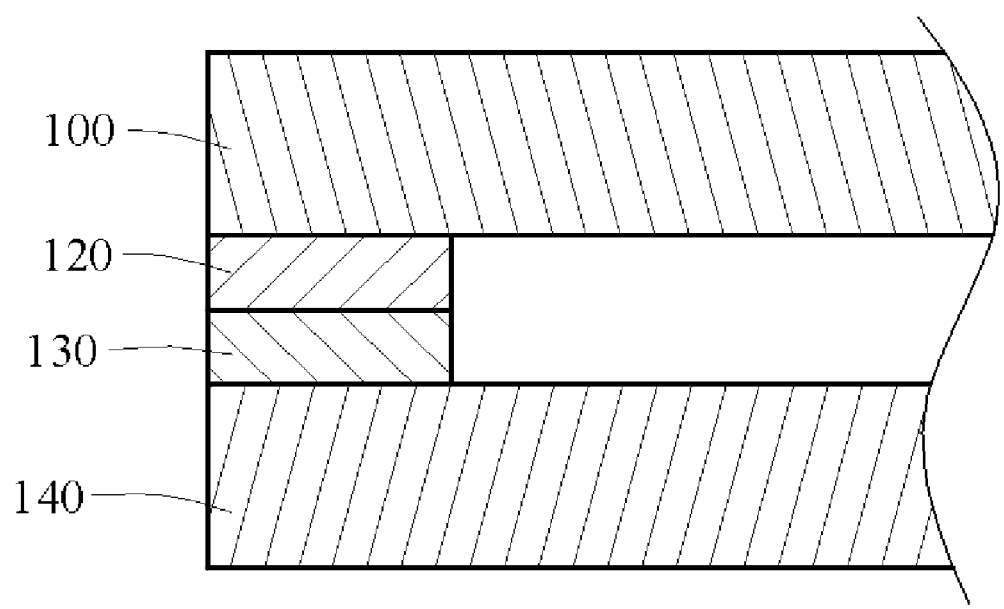
FIG. 7 is a seventh embodiment of the invention.

As shown in FIG. 7, it is the seventh embodiment of the invention. The light absorber 120 is made by mixing the resin, thermal conductive particle, light absorption particle, and adhesive, so that the light absorber 120 is thermal conductive, light absorptive, and sticky. The light reflector 130 is made by mixing the resin, thermal conductive particle, light reflective particle, and adhesives, so that the light reflector 130 is thermal conductive, light reflective, and sticky. In addition, the amount of the resin is plenty enough for supporting the thermal light absorber 120.

Moreover, a certain amount of resin can also be added to the light absorber 120 for supporting the light reflector 130. Therefore the resin for supporting may not be necessary included in the light reflector 130, which can thinner the thickness of the light reflector 130.

In the fifth, sixth, and seventh embodiments, since plenty of resins are added to the light absorber 120 or the light reflector 130 to support them, the thermal conductive layer 150 in the first, second, and third embodiments is not necessary in the fifth, sixth, and seventh embodiments.

According to the description above, the LCM package applies the light absorber 120 and the light reflector 130 to bind the liquid crystal panel 100 and the backlight module 140 to effectively dissipate the internal heat. Besides, the internal light efficiency can be improved by the light reflector 130 which adheres to the backlight module reflecting the light from the backlight module 140, and the reflection interference caused by the ambient light can be further avoided by the light absorber 120 which adheres to the liquid crystal panel 100 absorbing the ambient light. The processes and the materials for the light absorber 120 and the light reflector 130 may be modified according to the design of package as long as light absorbing with thermal conductivity property and/or light reflecting with thermal conductivity property are provided.

While the illustrative embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A liquid crystal display module (LCM) package, comprising:
   a liquid crystal panel;
   a light absorber having a first side and a second side, wherein the first side of the light absorber with thermal conductivity binds with one side of the liquid crystal panel;
   a light reflector having a first side and a second side, wherein the first side of the light reflector with thermal conductivity binds with the second side of the light absorber with thermal conductivity; and
   a backlight module, wherein one side of the backlight module binds with the second side of the light reflector with thermal conductivity;
   wherein at least one of the light absorber and the light reflector has thermal conductivity;
   thereby the heat generated from the backlight module is conducted to at least one of the light reflector and the light absorber.

2. The LCM package of claim 1, wherein the light absorber comprises:
   a first resin layer;
   a plurality of first thermal conductive particles distributed in the first resin layer;
   a plurality of light absorption particles distributed in the first resin layer; and
   a first adhesive coated on the first resin layer.

3. The LCM package of claim 2, wherein the first thermal conductive particles are metal particles, graphite particles, or ceramic particles.

4. The LCM package of claim 3, wherein the metal particles are selected from the group consisting of copper, silver, nickel, iron, aluminum, tin, cobalt, chromium, manganese, and alloys thereof.

5. The LCM package of claim 2, wherein the light absorption particles are black color particles.

6. The LCM package of claim 1, wherein the light reflector comprises:
   a second resin layer;
   a plurality of second thermal conductive particles distributed in the second resin layer;
   a plurality of light reflective particles distributed in the second resin layer; and
   a second adhesive coated on the second resin layer.

7. The LCM package of claim 6, wherein the second thermal conductive particles are metal particles, graphite particles, or ceramic particles.

8. The LCM package of claim 7, wherein the metal particles are selected from the group consisting of copper, silver, nickel, iron, aluminum, tin, cobalt, chromium, manganese, and alloys thereof.

9. The LCM package of claim 6, wherein the light reflective particles are white color particles.

10. The LCM package of claim 1, wherein the light reflector comprises:
    a metal layer; and
    an adhesive disposed on the metal layer.

11. The LCM package of claim 10, wherein the material of the metal layer is selected from the group consisting of copper, silver, nickel, iron, aluminum, tin, cobalt, chromium, manganese, and alloys thereof.

12. The LCM package of claim 10, wherein the thickness of the metal layer ranges from 10Å to 100μm.

13. The LCM package of claim 1, further comprising a thermal conductive layer located between the light absorber and the light reflector.

14. The LCM package of claim 13, wherein the thermal conductive layer comprises:
a third resin layer; and
a plurality of third thermal conductive particles distributed in the third resin layer.

15. The LCM package of claim 14, wherein the third thermal conductive particles are metal particles, graphite particles, or ceramic particles.

16. The LCM package of claim 15, wherein the metal particles are selected from the group consisting of copper, silver, nickel, iron, aluminum, tin, cobalt, chromium, manganese, and alloys thereof.

17. The LCM package of claim 13, wherein the thermal conductive layer is made of a metal material.

18. The LCM package of claim 17, wherein the metal material is selected from the group consisting of copper, silver, nickel, iron, aluminum, tin, cobalt, chromium, manganese, and alloys thereof.

19. The LCM package of claim 13, wherein the thickness of the thermal conductive layer ranges from 500Å to 1000μm.

* * * * *